United States Patent [19]
Sujita et al.

[11] Patent Number: 5,514,483
[45] Date of Patent: May 7, 1996

[54] ORGANIC COMPOSITE COATED STEEL PLATES HAVING IMPROVED CORROSION RESISTANCE IN AS-WORKED STATE

[75] Inventors: Shigeko Sujita; Ryoichi Muko; Kyoko Hamahara; Kazuo Mochizuki; Nobuyuki Morito, all of Chiba, Japan

[73] Assignee: Kawasaki Steel Corporation, Japan

[21] Appl. No.: 107,295

[22] Filed: Aug. 16, 1993

[30] Foreign Application Priority Data

Aug. 17, 1992 [JP] Japan .................................. 4-217669
Dec. 14, 1992 [JP] Japan .................................. 4-332637

[51] Int. Cl.$^6$ .......................... B32B 15/08; B32B 15/18
[52] U.S. Cl. .......................... 428/623; 428/626; 428/632
[58] Field of Search .................................. 428/623, 626, 428/416

[56] References Cited

U.S. PATENT DOCUMENTS

| | | | |
|---|---|---|---|
| 4,791,168 | 12/1988 | Salatin et al. | 524/601 |
| 4,794,147 | 12/1988 | Sanno et al. | 525/440 |
| 5,017,673 | 5/1991 | Balatan | 528/59 |

FOREIGN PATENT DOCUMENTS

| | | |
|---|---|---|
| 0348890 | 1/1990 | European Pat. Off. . |
| 0423740 | 4/1991 | European Pat. Off. . |
| 0423740A2 | 4/1991 | European Pat. Off. . |
| 0426328A2 | 5/1991 | European Pat. Off. . |
| 0485972A1 | 5/1992 | European Pat. Off. . |
| 57-108292 | 7/1982 | Japan . |
| 58-224174 | 12/1983 | Japan . |
| 61-36587 | 8/1986 | Japan . |
| 62-289274 | 12/1987 | Japan . |
| 63-22637 | 1/1988 | Japan . |
| 1-44387 | 9/1989 | Japan . |
| 2211762 | 7/1989 | United Kingdom . |
| 2230974 | 11/1990 | United Kingdom . |

*Primary Examiner*—John Zimmerman
*Assistant Examiner*—Linda L. Gray
*Attorney, Agent, or Firm*—Austin R. Miller

[57] ABSTRACT

The improved organic composite coated steel plate includes a zinc or zinc alloy plated steel plate as a substrate that has on its surface a chromate film the $Cr^{6+}$ content of which is no more than 70% of the total Cr content and which is deposited in an amount of 5–500 mg/m$^2$ in terms of metallic chromium, the chromate film being overlaid with a resin layer that is deposited in an amount of 0.1–3 g/m$^2$ on a dry weight basis and which is formed primarily of water-dispersed silica and one organic resin member as selected from the group consisting of an anionic aqueous resin, a nonionic aqueous resin and an anionic aqueous urethane resin. This steel plate is adapted for not contaminating the environment of the earth in the process of its manufacture.

7 Claims, 3 Drawing Sheets

SILICA CONTENT (PARTS BY WEIGHT)
PER 100 PARTS BY WEIGHT OF RESIN

1

ORGANIC COMPOSITE COATED STEEL PLATES HAVING IMPROVED CORROSION RESISTANCE IN AS-WORKED STATE

BACKGROUND OF THE INVENTION

This invention relates to an organic composite coated steel plate that is primarily intended for press forming to make an automotive body plate that has improved corrosion resistance in as-worked state.

In response to the growing need for increasing the corrosion resistance of automotive bodies, the car industry is recently expanding the use of cold rolled steel plates on the bodies of automobiles after they are plated with either zinc or zinc alloys. Included among such "surface-treated steel plates" are plated ones such as those prepared by hot dipping molten zinc or alloyed zinc and those prepared by electroplating zinc or zinc alloys. However, much higher corrosion resistance has been required in curled or hemmed portions of inner plates of car bodies where paint coatings as applied after car body assembly often fail to be deposited in the necessary thickness.

Automotive steel plates that are considered to be suitable for use in such areas were proposed by Japanese laid-Open (kokai) Application Nos. 57(1982)-108292 and 58(1983)-224174 and they are organic composite coated steel plates that are produced by applying a chromate film and a layer of organic high polymer resin on zinc or zinc alloy plated steel plates. These organic composite coated steel plates share the common feature that a paint containing a water-soluble or water-dispersed organic resin and a water-dispersed silica sol is applied on top of a chromated and zinc or zinc alloy plated steel plate so that the latter will develop high corrosion resistance. However, such organic composite coated steel plates have had the following problems:

(1) Since the water-soluble components remain in the formed organic composite coat, the resistance of the coat to the release of chromium is insufficient to prevent chromium from dissolving out of the composite coat during a subsequent chemical conversion treatment, and the released chromium can be a cause of environmental pollution;

(2) During alkali degreasing, the resin layer will separate from the substrate, thereby deteriorating its corrosion resistance;

(3) When the steel plate is used in a corrosive environment, water will enter the resin layer and the soluble components will dissolve to provide a highly alkaline condition, whereby the adhesion between the resin layer and the chromate film will deteriorate.

With a view to solving these problems, a method characterized by using a paint composition that contained not only a hydrophobic silica having its surface substituted by organic matter in the presence of an organic solvent but also an organic resin such as an epoxy rein was proposed in Japanese Laid-Open (kokai) Application No. 63(1988)-22637. This method has the advantage that the compatibility between the silica sol and the organic resin is insured and that, in addition, strong adhesion is achieved in as-painted state. However, the applied coat is not flexible enough to prevent damage from occurring in those areas of the coating layer which have been subjected to a working operation such as pressing and, as result, the corrosion resistance of those areas is unavoidably deteriorated.

This problem of low corrosion resistance in an as-worked state has been addressed by Japanese Laid-Open (kokai) Application No. 62(1987)-289274, which proposes a method characterized by providing a coating layer that contains a urethane base resin and silicon dioxide as main ingredients. The method achieves some improvement in workability but as it turned out, deterioration in the corrosion resistance of the thus coated one was still unavoidable when it was subjected to working under severer conditions. A particular problem occurred when an aqueous resin was used; namely, depending on the combination with water-dispersed silica, the aqueous resin did not have sufficient compatibility with silica to permit the preparation of an effective paint.

Fingerprint-free steel plates for use in home electric appliances have been proposed in Japanese Patent Publication (kokoku) Nos. 61(1986)-36487 and 1(1989)-44387. The methods they teach comprise forming a chromate film on a steel plate that has been electroplated with a zinc alloy, applying an aqueous solution comprising a carboxylated polyethylenic resin dispersion and a colloidal silica, and drying the applied solution to form a composite coating. The steel plates produced by these methods are evaluated by a salt spray test but the test conditions differ so greatly from the environment under which the steel plates are to be used on automotive bodies that the composite coating formed by the methods under consideration have failed to exhibit satisfactory performance in a corrosion test conducted under the conditions specified by the present invention. It should also be noted that the steel plates produced by those methods did not bring about good results when tested in accordance with the present invention.

A further problem with the prior art is that most of the paints used today are based on organic solvents, particularly on aromatic hydrocarbon containing solvents. However, these solvents are sources of air pollution and to reduce their use drastically is a global concern.

SUMMARY OF THE INVENTION

An object, therefore, of the present invention is to solve the aforementioned problems of the prior art and provide a highly corrosion-resistant organic composite coated steel plate that is particularly adapted for not contaminating the environment of the earth in the process of its manufacture.

The present invention has been accomplished in order to solve the many problems of the prior art. The present inventors conducted detailed investigations on aqueous paints that were formulated by combining a water-dispersed silica with various aqueous organic resins. As a result, the inventors found that when the water-dispersed silica was combined with anionic aqueous resins, nonionic aqueous resins or anionic aqueous urethane resins, the problems (1)–(3) listed hereinabove in connection with the prior art could be effectively solved and that those resins had a good enough compatibility with the silica to enable the formulation of a desired paint which, when applied to steel plates, provided them with improved corrosion resistance in an as-worked state. The present invention has been accomplished on the basis of these findings; in accordance with this invention, organic composite coated steel plates having improved corrosion resistance in an as worked state can be produced using water-based paints but without contaminating the environment of the earth.

Hence, the present invention provides an organic composite coated steel plate having improved corrosion resistance in an as-worked state that comprises a zinc or zinc alloy plated steel plate as a substrate which has on its surface a chromate film the $Cr^{6+}$ content of which is no more than 70% of the total chromium content and which is deposited in an amount of 5–500 mg/m² in terms of metallic chromium, said chromate film being overlaid with a resin layer that is deposited in an amount of 0.1–3 g/m² on a dry weight basis and which is formed primarily of a water-dispersed silica and one organic resin member as selected from the group consisting of an anionic aqueous resin, a nonionic aqueous resin and an anionic aqueous urethane resin.

In a preferred embodiment, the silica to be used in the organic composite coated steel plate is an aqueous silica sol having an average particle size of 0.005– 2 μm.

In another preferred embodiment, the silica in the organic composite coated steel plate is a water-dispersed hydrophobic fumed silica.

In yet another preferred embodiment, the proportions on a dry weight basis of the silica and the organic resin in the resin layer of the organic composite coated steel plate are such that the silica is present in an amount of 10–100 parts by weight per 100 parts by weight of the resin if it is an anionic aqueous resin or a nonionic aqueous resin, and that the silica is present in an amount of 10–60 parts by weight per 100 parts by weight of the resin if it is an anionic aqueous urethane resin.

In the case of using an anionic urethane resin, it is preferred to select one that has an elongation of 50– 1,000% and a tensile strength of at least 200 kgf/cm².

DETAILED DESCRIPTION OF THE INVENTION

Figure 1:
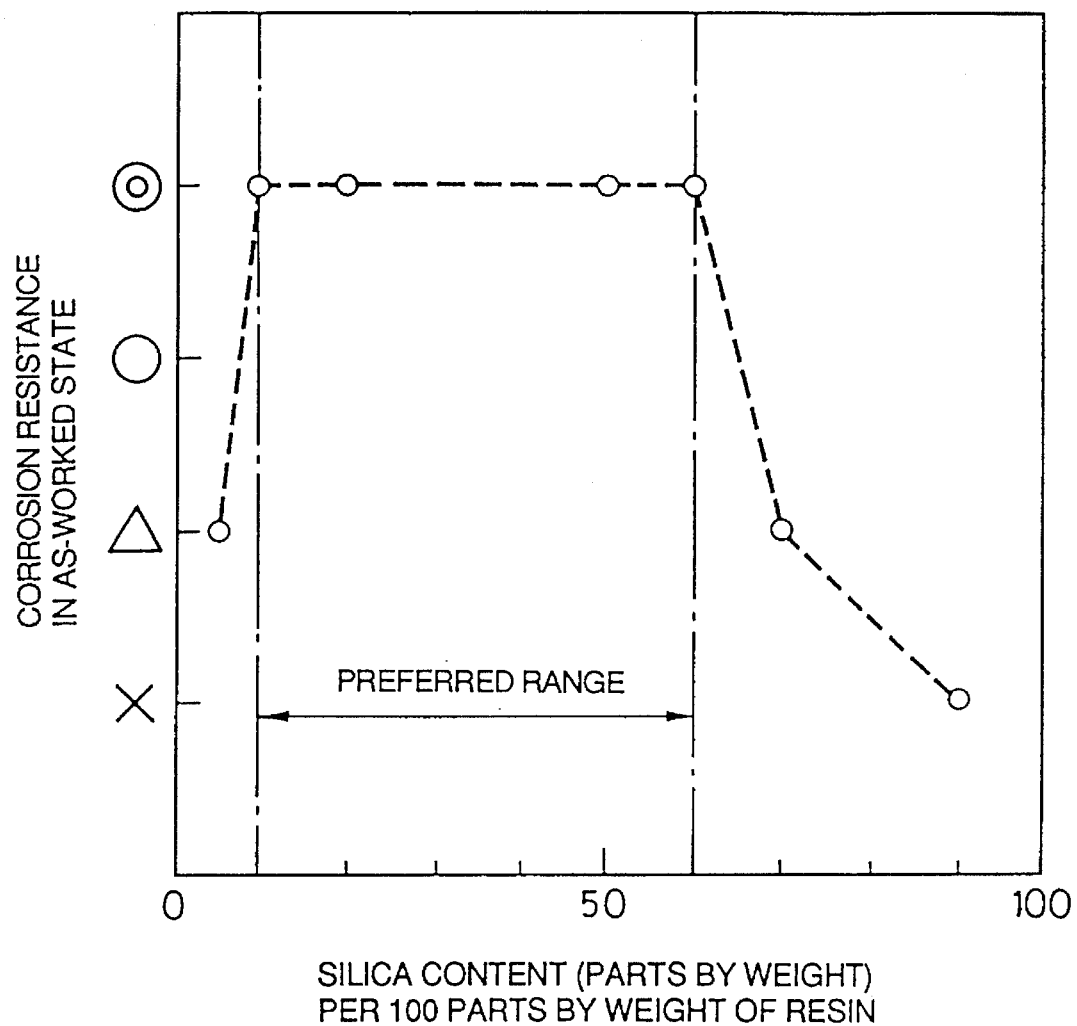
FIG. 1 is a graph showing how the corrosion resistance of the organic composite coated steel plate of the present invention in an as-worked state varied with the proportions of organic resin and silica.

The present invention is described below in detail.

The steel plate or sheet to be used in the present invention is either a zinc or a zinc alloy plated steel plate or sheet. Various plates may be applied, including a pure zinc plate, a binary alloy plate such as a Zn-Ni, Zn-Fe or Zn-Cr alloy plate, and a ternary alloy plate such as a Zn-Ni-Cr or Zn-Co-Cr alloy plate. The scope of applicable plates is broad enough to include composite dispersive plates such as $Zn-SiO_2$ and $Zn-Co-Cr-Al_2O_3$ plates. These plates may be applied by either electroplating, hot dipping or vapor-phase plating.

The surfaces of these zinc or zinc alloy plated steel plates are chromated in order to provide improved adhesion to an organic high polymer resin layer (which is to be subsequently applied and is described later in this specification) and, hence, in order to impart higher corrosion resistance. The chromate film should be deposited in an amount of 5–500 mg/m², preferably 10– 150 mg/m²; in terms of metallic chromium. Below 5 mg/m², not only corrosion resistance but also the adhesion to a later formed resin layer is insufficient. Above 500 mg/m², no further improvement is achieved in corrosion resistance; on the contrary, the insulating film resistance will increase so much as to lower the efficiency of spot welding or electrodeposition coating.

The chromate treatment may be performed by any known method such as a coating method using a roll coater, an electrolytic method or a reactive method. The proportion of $Cr^{6+}$ in the chromate film should be no more than 70% of the total Cr content. Beyond 70% the chance of chromium release from the chromate film during alkali degreasing will increase.

The chromate film thus formed is subsequently overlaid with an organic composite coating that contains a water-dispersed silica and one organic resin member as selected from the group consisting of an anionic aqueous resin, a nonionic aqueous resin and an anionic aqueous urethane resin.

A suitable aqueous resin may be selected from among water-dissolved and water-dispersed resins which have hydrophilic groups introduced into the resin matrix, or from emulsion-type resins prepared by forced emulsification. Water-dispersed resins are used advantageously since the other types of resins may fail to impart the necessary corrosion resistance in the presence of a residual emulsifier (in the case of the emulsion-type resin) or on account of low molecular weight (in the case of the water-dissolved resin). Resins that are of a water-dispersed type and which contain an emulsifier can also be used with advantage.

As a result of the detailed investigation of the aqueous resins that could be used in the present invention, the present inventors found that anionic and nonionic aqueous resins could advantageously be used.

The anionic aqueous resin is an aqueous resin having anionic hydrophilic groups introduced into the resin matrix, and the nonionic aqueous resin is an aqueous resin having nonionic hydrophilic groups introduced into the resin matrix. Exemplary anionic hydrophilic groups include a carboxyl group, a sulfonic group and a phosphate ester group, and exemplary nonionic hydrophilic groups include polyethylene glycol, a hydroxyl group, an amido group and a methylol group. These anionic or nonionic hydrophilic groups are introduced into a suitable matrix resin to make the anionic or nonionic aqueous resin that can be used in the present invention. The organic resin to be used in the present invention must be an anionic or nonionic aqueous resin for the following reason: the aqueous silica sol as formulated in a paint forms a dispersion of negatively charged particles, so if a cationic resin is used, there will be no electric repulsion between the silica and the resin and the paint will turn into a gel that cannot be easily applied onto a steel plate.

The matrix resin that can be rendered aqueous by introducing anionic or nonionic hydrophilic groups is not limited to any particular kind and exemplary resins that can advantageously be used include acrylic resins, epoxy resins, urethane resins, alkyd resins and polyester resins, as well as resins that are partly modified in their matrix by combining those resins, as exemplified by a urethane-modified epoxy resin, an epoxy-modified urethane resin and an acryl-modified epoxy resin. However, it should be noted that carboxylated polyethylenic resins are excluded since they performed poorly in the corrosion and spot welding tests conducted in accordance with the present invention.

Anionic aqueous urethane resins can also be used advantageously in the present invention. The urethane base resin is a high polymer compound having many urethane bonds in the molecule and those compounds which have the resin matrix partly modified with an acryl, epoxy, alkyd, ester, etc. can also be used with advantage.

In accordance with the present invention, the proportions of the anionic aqueous urethane base resin and the water-dispersed silica are such that the silica is present in an amount of 10–60 parts by weight per 100 parts by weight of the resin. FIG. 1 shows the results of a test conducted on the organic composite coated steel plate of the present invention to check how the corrosion resistance of the steel plate in an as-worked state varied with the proportions of the resin and the silica. The test conditions were as set forth below. For details of the evaluation method, see the description under "Examples and comparative Examples".

Plate: Zn-13.0 % Ni (electroplated) basis weight=20 g/m$^2$

Chromate film: $Cr^{6+}$/tot. Cr=65%; deposit=45 mg/m$^2$

Resin layer: Anionic aqueous polyurethane emulsion ("HUX-290H") of Asahi Denka Kogyo, K.K.; elongation, 700%; tensile strength, 350 kgf/cm$^2$) and water-dispersed silica sol comprising uniformly sized particles ("ST-30") of Nissan Chemical Industries, Ltd.; average particle size, 0.01 μm); deposit=0.9 g/m$^2$.

To evaluate the corrosion resistance of the steel plate in an as-worked state, test samples prepared by drawing to a cylindrical form (draw ratio, 2.0; blank holder force, 1,000 kg) were subjected to a composite cycle corrosion test, in which one cycle consisted of 4-h spraying with a 5% aqueous NaCl solution (35° C.), 6-h drying (60° C.) and 2-h standing in a wet environment (95% R.H. at 50° C.). After 50 cycles, the percent coverage of the side wall of each sample with red rust was measured.

FIG. 1 shows that the organic composite coated steel plate of the present invention had satisfactory corrosion resistance in an as-worked state when the anionic aqueous urethane base resin was incorporated in an amount of 10– 60 parts by weight of the water-dispersed silica per 100 parts by weight of the resin.

Figure 2:
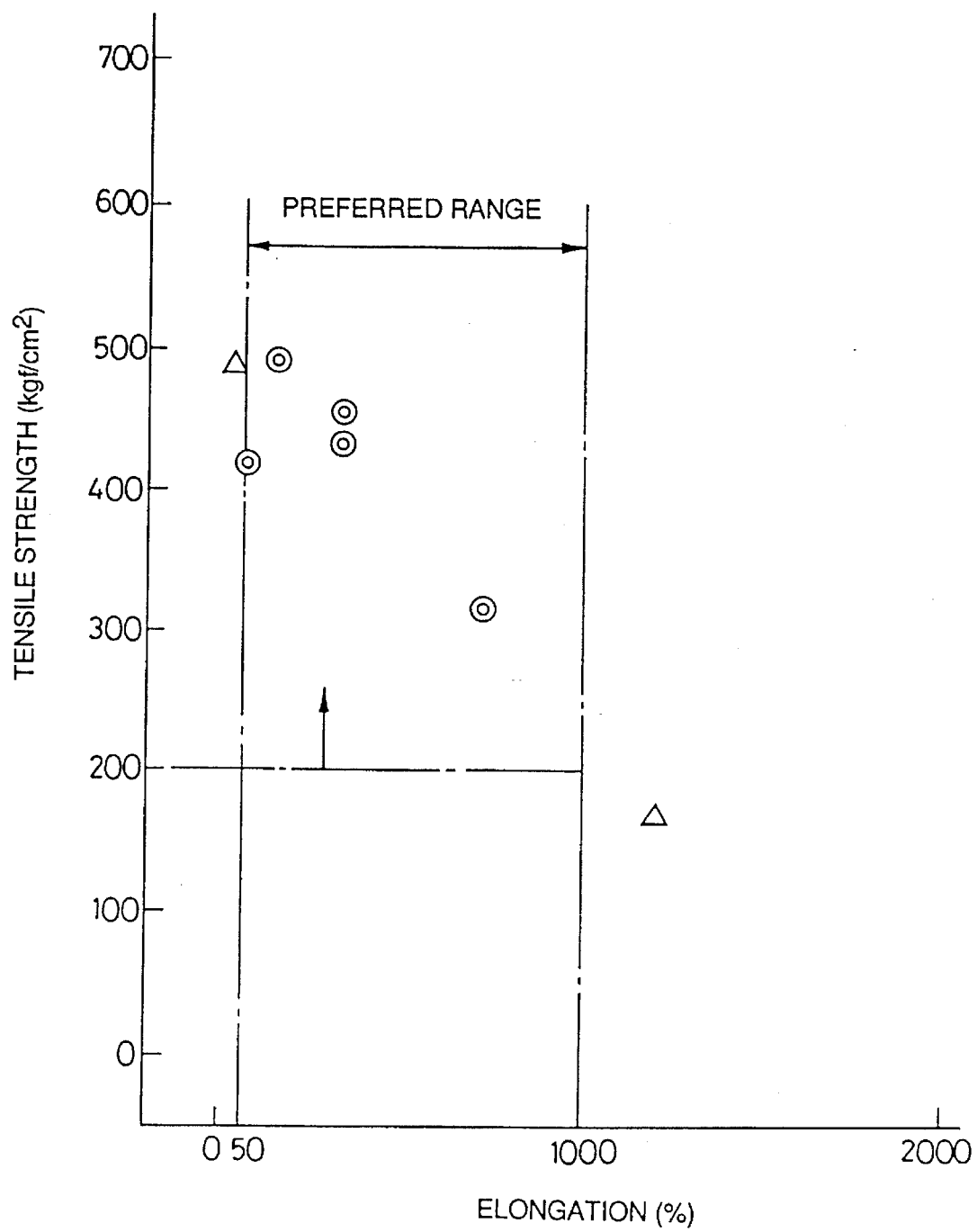
FIG. 2 is a graph showing how the corrosion resistance of the organic composite coated steel plate of the present invention in an as-worked state varied as a function of the elongation and tensile strength of an anionic aqueous urethane resin.

Another important factor of the anionic aqueous urethane resin is the balance between its elongation and tensile strength. The preferred range is 50–1,000% for elongation and 200 kg/cm$^2$ or more for tensile strength. FIG. 2 shows the results of a test conducted on the organic composite coated steel plate of the present invention to check how the corrosion resistance of the plate in as-worked state varied as a function of the elongation and tensile strength of the urethane resin. The test conditions were as set forth below. For details of the evaluation method, see the description under "Examples and Comparative Examples".

Plate: Zn-12.5% Ni (electroplated) Basis weight=20 g/m$^2$

Chromate film: $Cr^{6+}$/tot. Cr=65%; deposit=50 mg/m$^2$

Resin layer: Anionic water-dispersed aqueous urethane resin and water-dispersed silica sol comprising uniformly sized particles ("ST-20" of Nissan Chemical Industries, Ltd.; average particle size, 0.01 μm); resin/silica=80/20; deposit= 0.9 g/m$^2$ As in the case of obtaining the data shown in FIG. 1, the corrosion resistance of the organic composite coated steel plate in an as-worked state was evaluated by measuring the percent coverage of the side wall of each sample with red rust after 50 cycles of testing steps. One can see from FIG. 2 that the steel plate of the present invention had satisfactory corrosion resistance in an as-worked state when the anionic aqueous urethane resin had an elongation of 50–1,000% and a tensile strength of at least 200 kgf/cm$^2$.

It is important for the silica in the organic composite coating of the steel plate of the present invention to have an appropriate amount of silanol groups present on the surfaces of silica particles and this is in order to insure that the zinc-base corrosion product is held in a stable form in a corrosive environment, thereby imparting high corrosion resistance to the steel plate. The water-dispersed silica is particularly advantageous for the purpose of insuring an adequate amount of silanol groups.

Two specific examples of the silica that can advantageously be used are (1) an aqueous silica sol that is adjusted to have an average particle size of 0.005–2 μm by controlling the charged state of the surfaces of particles in a water-dispersed silica sol through adjustment of the quantity of alkali metal or polyvalent metal ions; and (2) a hydrophobic fumed silica comprising particles that have been dispersed in water with the aid of a suitable dispersant.

The aqueous silica sol (1) preferably has an average particle size in the range of 0.005–2 μm. When the average size of agglomerated particles was less than 0.005 μm, the silica particles were dispersed uniformly in the resin layer, causing deterioration in the spot weldability of the steel plate. If the average size of agglomerated particles exceeds 2 μm, a significant number of silica agglomerates will become exposed on the outer surface of the resin layer; if spot welding is performed on the steel plate under such conditions, the electric resistance between an electrode and the steel plate will increase so much that sparking occurs during the welding operation and the electrodes will be damaged at an accelerated rate to lower the efficiency of spot welding. The silica particles may be uniform in size or, alternatively, the primary particles may agglomerate to secondary particles of an average size within the range of 0.005–2 μm.

As a result of dispersion in water, silanol groups are also allowed to be present on the surfaces of the particles of the hydrophobic fumed silica (2). Hence, the corrosion product can be held in a stable form and this effect is noticeable when the silica is combined with the aqueous resin, thereby contributing to an improvement in the corrosion resistance of the steel plate in an as-worked state.

When an anionic or nonionic aqueous resin is incorporated in the resin layer, the silica is preferably contained in an amount of 10–100 parts per 100 parts of the resin on a dry weight basis. When the silica content was less than 10 parts by weight, the zinc-base corrosion product that formed in the coating upon exposure to a corrosive environment could not be held in a stable form and, hence, the desired high corrosion resistance could not be achieved. If the silica content exceeds 100 parts by weight, no compatibility with the resin composition is attained and the paint as formulated from the two ingredients cannot be easily applied to the substrate steel plate.

Figure 3:
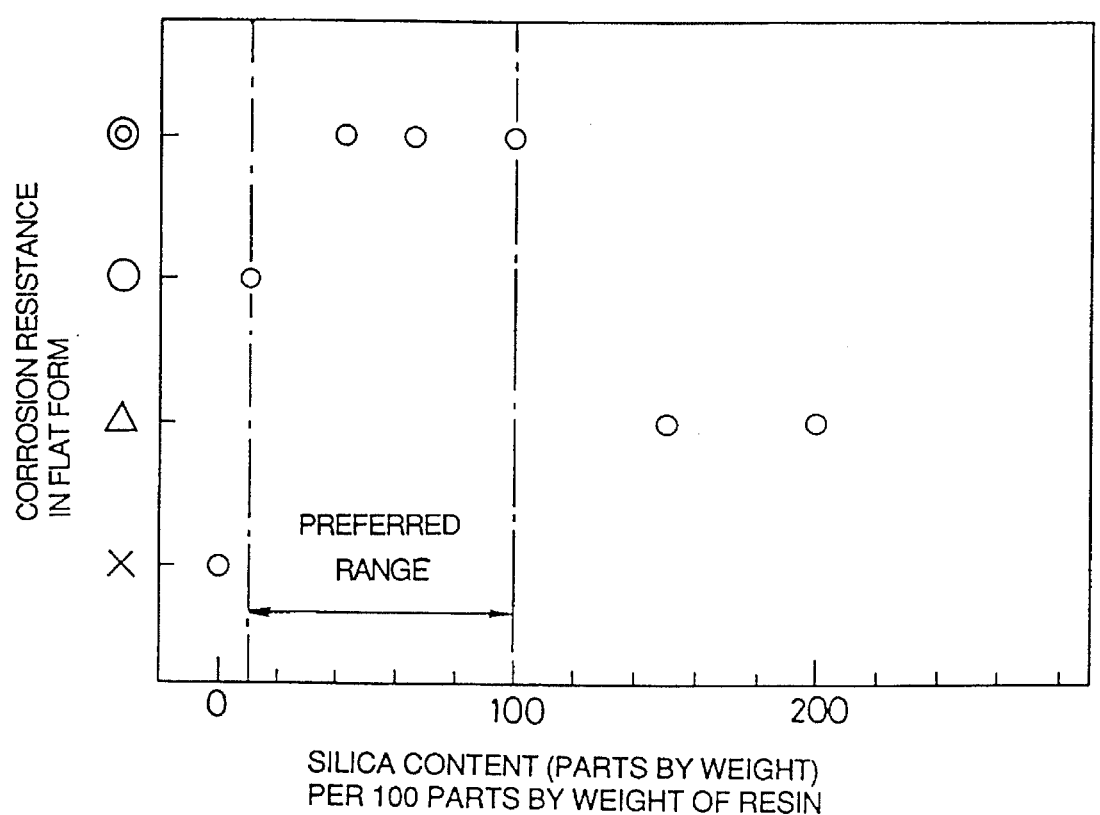
FIG. 3 is a graph showing how the corrosion resistance of the organic composite coated steel plate of the present invention in a flat form varied with the proportions of organic resin and silica.

FIG. 3 shows the results of a test conducted on the organic composite coated steel plate of the present invention to check how the corrosion resistance of the plate in a flat form varied with the proportions of the resin and the silica. The test conditions were as set forth below. For details of the evaluation method, see the description under "Examples and Comparative Examples".

Plate: Zn-13.2% Ni (electroplated) Basis weight=20 g/m$^2$

Chromate film: $Cr^{6+}$/tot. Cr=60%; deposit= 50 mg/m$^2$

Resin layer: Anionic acrylic resin (artionic acryl resin including polymethyl methacrylate and polyacrylic acid in a mixed state) and water-dispersed fumed silica ("AEROSIL 136" of Nihon Aerosil K.K.; particle size, 15 μm); deposit= 0.8 g/m$^2$ As one can see from FIG. 3, the organic composite coated steel plate of the present invention had satisfactory corrosion resistance in a flat form when the composite coating contained 10–100 parts by weight of silica for 100 parts by weight of the resin.

Furthermore, an aqueous paint used in the present invention may include a crosslinking agent in accordance with baking conditions.

An aqueous paint formulated from the aqueous resin and the water-dispersed silica can be applied to the chromate film by roll coating, knife coating or any other coating methods that are used extensively in industrial areas.

The organic composite coating layer (or simply referred to as the "organic resin layer") in accordance with the present invention should be deposited in an amount of 0.1–3 g/m$^2$ on a dry weight basis. Below 0.1 g/m$^2$ the desired corrosion resistance is not attainable; above 3 g/m$^2$ the film resistance will increase so much that the efficiency of spot welding or electrodeposition coating is lowered. If the organic composite coated steel plate of the present invention is to be exposed as it is to a corrosive environment, assuring the organic composite coating layer to be deposited in an amount of at least 0.3 g/m$^2$ is preferred from the viewpoint of corrosion resistance. The present inventors confirmed by experimentation that when electrodeposited coatings were to be applied on the organic composite coated steel plate, the presence of at least 0.1 g of the organic resin layer per square meter was sufficient to afford satisfactory corrosion resistance.

The organic resin layer may be provided on one or both sides of the substrate steel plate. In the case of one-side coating, the surface to be uncoated may be a zinc or zinc alloy plate, a chromate film formed on the zinc or zinc alloy plate, or the cold rolled surface of the substrate steel plate.

EXAMPLES

The following examples are provided for the purpose of further illustrating the present invention but are in no way to be taken as limiting.

Examples 1–5 and Comparative Examples 1–3

Various steel plate samples with Zn or Zn alloy plate on both sides (steel plate thickness, 0.80 mm) were degreased, roll coated with chromate films at varying $Cr^{6+}$/tot. Cr rations in varying deposits, and baked for a maximum ultimate temperature of 130° C. The thus prepared steel plates were roll coated with paints that were formulated from mixtures of aqueous resins, and various silicas having different average particle sizes. The applied paints were baked at a maximum ultimate temperature of 160° C. and, immediately thereafter, the steel plates were cooled with water and dried. The following silicas were used in formulating the paints:

A: water-dispersed silica sol comprising particles of uniform size (Nissan Chemical Industries, Ltd.)

B: water-dispersed silica sol comprising agglomerated particles (Nissan Chemical Industries, Ltd.)

C: water-dispersed chain-like silica sol (Nissan Chemical Industries, Ltd.)

D: water-dispersed hydrophobic fumed silica (specific surface area= 200 m2/g; Nihon Aerosil K.K.)

The performance of these organic composite coated steel plate products was evaluated by various tests.

To evaluate their corrosion resistance in a flat form, the samples were subjected to a composite cycle corrosion test, in which one cycle consisted of 4-h spraying with a 5% aqueous NaCl solution (35° C.), 2-h drying (60 C.) and 2-h standing in a wet environment (95% R.H.× 50° C.). The development of red rust in each test sample was examined after 200 cycles. The corrosion resistance of each test sample in a flat form was evaluated by the following criteria in terms of percent coverage with red rust: ⊙, none; o, < 10%; Δ, 10–20%; X, >20%.

To evaluate their corrosion resistance in an as-worked state, the samples were drawn to a cylindrical form (draw ratio, 2.0; blank holder force, 1,000 kg); the cylinders were then subjected to a composite cycle corrosion test, in which one cycle consisted of 4-h spraying with a 5% aqueous NaCl solution (35° C.), 2-h drying (60° C.) and 2-h standing in a wet environment (95% R.H.×50° C.). The development of red rust in the side wall of each test sample was examined after 50 cycles. The corrosion resistance of each test sample in an as-worked state was evaluated by the same criteria as in the evaluation of corrosion resistance in a flat form.

To evaluate their resistance to the release of chromium, the samples were subjected to four steps of treatment, degreasing, washing with water, surface preparation, and chemical conversion, and the resulting change in Cr deposit that occurred in each sample was measured by X-ray fluoroscopy. The resistance to chromium release was evaluated by the following criteria: o, < 1 mg/m$^2$; Δ, 1–2 mg/m$^2$; X, >2 mg/m$^2$.

To evaluate their spot weldability, the samples were subjected to continuous spot welding with a welding tip (6 mm$^⌀$) made of $Al_2O_3$ dispersed Cu alloy under the following conditions: welding pressure, 200 kgf; welding current, 9 kA; weld time, 10 Hz. The number of spots that could be welded continuously until the nugget diameter became smaller than the reference diameter was counted and the spot weldability of each sample was evaluated by the following criteria: ⊙, >3000; o, 2000–3000; Δ, 1000–2000; X, < 1000.

Table 1 summarizes the characteristics of the individual test samples (e.g., chromate film, organic resin, and the distribution of silica in the resin layer) and the results of various tests conducted on these samples.

Examples 6–14 and Comparative Examples 4–8

Various steel plate samples with Zn or Zn alloy plate on both sides (steel plate thickness, 0.75 mm) were degreased, roll coated with chromate films at varying $Cr^{6+}$/tot. Cr ratios in varying deposits, and baked for a maximum ultimate temperature of 130° C. The thus prepared steel plates were roll coated with paints that were formulated from mixtures of anionic urethane base resins (as rendered aqueous by different methods, elongation and tensile strength), partly modified resins (which were optional and modification effected by epoxy, ester or alkyd), and various silicas having different average particle sizes. The applied paints were baked for a maximum ultimate temperature of 160° C. and, immediately thereafter, the steel plates were cooled with water and dried. The same silicas were used as in Examples 1–5 and Comparative Examples 1–3:

The performance of these organic composite coated steel plate products was evaluated by the same tests as conducted to obtain the data shown in Table 1.

Table 2 summarizes the characteristics of the individual test samples (e.g. chromate film, organic resin, and the distribution of silica in the resin layer) and the results of various tests conducted on these samples.

As described on the foregoing pages, the organic composite coated steel plate of the present invention exhibits high corrosion resistance both in a flat form and in an as-worked state while having good spot weldability. Therefore, it solves all the problems in the use of conventional water-based paints and can be used not only in making automotive parts but also in a broad range of applications where equally high quality characteristics are required. Obviously, the present invention has a very high industrial value.

TABLE 1-3

| Run No. | corrosion resistance in flat form | corrosion resistance in as-worked state | resistance to chromium release | spot weldability |
|---|---|---|---|---|
| Example | | | | |
| 1 | ○ | ○ | ○ | ⊚ |
| 2 | ⊚ | ⊚ | ○ | ⊚ |
| 3 | ⊚ | ⊚ | ○ | ⊚ |
| 4 | ○ | ○ | ○ | ⊚ |

TABLE 1-1

| | Plate | | Chromate film | | resin | modified resin | | silica | | | |
|---|---|---|---|---|---|---|---|---|---|---|---|
| Run No. Example | type | basis weight (g/m²) | Cr⁶⁺/ tot. Cr (%) | deposit (mg/m²) | group introduced & type of resin | type | degree of modification (%) | type | average particle size (μm) | content (parts by weight) | deposit (g/m²) |
| 1 | Zn (electro-plated) | 30 | 55 | 90 | carboxyl group anionic urethane resin | epoxy | 30 | C | 0.13 | 50 | 0.6 |
| 2 | Zn-12.5% Ni (electro-plated) | 30 | 55 | 90 | carboxyl group anionic epoxy resin | acryl | 50 | A | 0.01 | 60 | 2.5 |
| 3 | Zn-12.5% Ni (electro-plated) | 30 | 50 | 55 | carboxyl group anionic epoxy resin | acryl | 50 | C | 0.13 | 30 | 1.8 |
| 4 | Zn (hot dipped) | 60 | 60 | 35 | carboxyl group anionic epoxy resin | acryl | 50 | D | — | 40 | 1.0 |
| 5 | Zn (electro-plated) | 30 | 65 | 100 | carboxyl group anionic epoxy resin | acryl | 50 | B | 2.5 | 40 | 1.0 |

* per 100 parts by weight of resin

TABLE 1-2

| | Plate | | Chromate film | | resin | modified resin | | silica | | | |
|---|---|---|---|---|---|---|---|---|---|---|---|
| Run No. Comparative Example | type | basis weight (g/m²) | Cr⁶⁺/ tot. Cr (%) | deposit (mg/m²) | group introduced & type of resin | type | degree of modification (%) | type | average particle size (μm) | content (parts by weight) | deposit (g/m²) |
| 1 | Zn (electro-plated) | 30 | 50 | 100 | carboxyl group anionic epoxy resin | urethane | 50 | A | 0.015 | 50 | 5.5 |
| 2 | Zn-12.5% Ni (electro-plated) | 30 | 65 | 65 | cationic urethane resin | — | — | B | 0.50 | 20 | 1.0 |
| 3 | Zn (electro-plated) | 30 | 50 | 100 | carboxyl group anionic polyethylene | — | — | A | 0.010 | 20 | 1.4 |

* per 100 parts by weight of resin

TABLE 1-3-continued

| Run No. | corrosion resistance in flat form | corrosion resistance in as-worked state | resistance to chromium release | spot weld-ability |
|---|---|---|---|---|
| 5 C. Ex. | O | O | O | Δ |
| 1 | O | O | O | X |

TABLE 1-3-continued

| Run No. | corrosion resistance in flat form | corrosion resistance in as-worked state | resistance to chromium release | spot weld-ability |
|---|---|---|---|---|
| 2 | X | X | Δ | Δ |
| 3 | X | X | Δ | X |

TABLE 2-1

| | Plate | | Chromate film | | organic resin layer | | | | | |
|---|---|---|---|---|---|---|---|---|---|---|
| | | | | | urethane resin | | | silica | | |
| Run No. Example | type | basis weight (g/m²) | $Cr^{6+}$/ tot. Cr (%) | deposit (mg/m²) | classification by method of rendering aqueous | elongation (%) | tensile strength (kgf/cm²) | type | average particle size (μm) | content (parts by weight)* | deposit (g/m²) |
| 6 | Zn (electro-plated) | 20 | 50 | 50 | water dispersed | 1000 | 150 | A | 0.01 | 40 | 0.6 |
| 7 | Zn (electro-plated) | 20 | 50 | 50 | emulsion type | 30 | 700 | A | 0.01 | 40 | 0.8 |
| 8 | Zn-12.2% Ni (electro-plated) | 20 | 50 | 50 | water dissolved | 700 | 300 | A | 0.05 | 20 | 0.5 |
| 9 | Zn-12.2% Ni (electro-plated) | 20 | 65 | 80 | emulsion type | 300 | 500 | C | 0.15 | 25 | 2.2 |
| 10 | Zn-12.2% Ni (electro-plated) | 30 | 50 | 60 | emulsion type | 300 | 500 | D | — | 30 | 0.6 |
| 11 | Zn (hot dipped) | 50 | 50 | 45 | water dispersed | 80 | 500 | B | 0.45 | 30 | 1.2 |
| 12 | Zn (hot dipped) | 50 | 60 | 45 | water dispersed | 80 | 500 | B | 0.45 | 20 | 0.5 |
| 13 | Zn (hot dipped) | 50 | 50 | 45 | water dispersed | 1800 | 110 | B | 0.25 | 50 | 0.5 |
| 14 | Zn (hot dipped) | 50 | 50 | 65 | water dispersed | 400 | 300 | B | 3.05 | 20 | 0.5 |

* per 100 parts by weight of resin

TABLE 2-2

| | Plate | | Chromate film | | organic resin layer | | | | | |
|---|---|---|---|---|---|---|---|---|---|---|
| | | | | | urethane resin | | | silica | | |
| Run No. Comparative Example | type | basis weight (g/m²) | $Cr^{6+}$/ tot. Cr (%) | deposit (mg/m²) | classification by method of rendering aqueous | elongation (%) | tensile strength (kgf/cm²) | type | average particle size (μm) | content (parts by weight)* | deposit (g/m²) |
| 4 | Zn | 20 | <u>75</u> | 100 | water | 200 | 200 | A | 0.02 | 40 | 0.6 |

TABLE 2-2-continued

| | | | | organic resin layer | | | | | | |
|---|---|---|---|---|---|---|---|---|---|---|
| | Plate | | Chromate film | | urethane resin | | | silica | | |
| Run No. Comparative Example | type | basis weight (g/m²) | Cr⁶⁺/ tot. Cr (%) | deposit (mg/m²) | classification by method of rendering aqueous | elongation (%) | tensile strength (kgf/cm²) | type | average particle size (μm) | content (parts by weight) * | deposit (g/m²) |
| 5 | Zn (electroplated) | 20 | 65 | 100 | dissolved water dissolved | 200 | 200 | A | 0.02 | 40 | <u>4.3</u> |
| 6 | Zn-12.2% Ni (electroplated) | 20 | 50 | 65 | emulsion type | 300 | 500 | D | — | <u>5</u> | 1.0 |
| 7 | Zn-12.2% Ni (electroplated) | 20 | 50 | 65 | water | 200 | 200 | A | 0.01 | <u>67</u> | 1.1 |
| 8 | Zn (hot dipped) | 50 | 50 | <u>650</u> | water dissolved | 300 | 200 | A | 0.015 | 30 | 0.6 |

* per 100 parts by weight resin

TABLE 2-3

| Run No. | corrosion resistance in flat form | corrosion resistance in as-worked state | resistance to chromium release | spot weldability |
|---|---|---|---|---|
| Example | | | | |
| 6 | ○ | ○ | ○ | ⊙ |
| 7 | ○ | ○ | ○ | ⊙ |
| 8 | ⊙ | ⊙ | ○ | ⊙ |
| 9 | ⊙ | ⊙ | ○ | ⊙ |
| 10 | ⊙ | ⊙ | ○ | ⊙ |
| 11 | ○ | ○ | ○ | ⊙ |
| 12 | ○ | ○ | ○ | ⊙ |
| 13 | ○ | Δ | ○ | ⊙ |
| 14 | ○ | ○ | ○ | Δ |
| C. Example | | | | |
| 4 | ○ | ○ | X | ○ |
| 5 | ○ | ○ | ○ | X |
| 6 | X | X | ○ | ○ |
| 7 | ○ | Δ | ○ | Δ |
| 8 | ○ | ○ | Δ | X |

What is claimed is:

1. An organic composite coated steel plate having improved corrosion resistance in an as-worked state that comprises:

a steel plate substrate;

a plating layer positioned in contact with said substrate, said plating layer being selected from the group consisting of zinc and zinc alloy;

a chromate film positioned in contact with said plating layer, said chromate film having a Cr⁶⁺ content which is up to but no more than 70% of the total chromium content of said film, said chromate film being present in an amount of 5–500 mg/m² in terms of metallic chromium;

an aqueous resin layer comprising water-dispersed silica and anionic aqueous resin, which layer is positioned in contact with said chromate film, and which is present in an amount of 0.1–3 g/m² on a dry weight basis, said resin layer comprising a non-gelled mixture of a water-dispersed silica and an anionic aqueous resin, said water-dispersed silica comprising a dispersion of negatively-charged particles, whereby said resin layer possesses a structure resulting from repulsion between said negatively-charged particles and said anionic aqueous resin.

2. An organic composite coated steel plate having improved corrosion resistance in an as-worked state that comprises:

a steel plate substrate;

a plating layer positioned in contact with said substrate, said plating layer being selected from the group consisting of zinc and zinc alloy;

a chromate film positioned in contact with said plating layer, said chromate film having a Cr⁶⁺ content which is up to but no more than 70% of the total chromium content of said film, said chromate film being present in an amount of 5–500 mg/m² in terms of metallic chromium;

an aqueous resin layer comprising water-dispersed silica and anionic aqueous resin, which layer is positioned in contact with said chromate film, and which is deposited in an amount of 0.1–3 g/m² on a dry weight basis, said resin layer comprising a non-gelled mixture of a water-dispersed silica and an anionic aqueous urethane resin, said water-dispersed silica comprising a dispersion of negatively-charged particles, whereby said resin layer possesses a structure resulting from repulsion between said negatively-charged particles and said anionic aqueous urethane resin, the proportion on a dry weight basis of the silica and the urethane resin in the resin layer being 10–60 parts by weight silica per 100 parts by weight urethane resin.

3. An organic composite coated steel plate according to any one of claims 1 or 2 wherein the silica in the resin layer is made from an aqueous silica sol having an average particle size of 0.005–2 μm.

4. An organic composite coated steel plate according to any one of claims 1–2 wherein the silica in the resin layer is made from a water-dispersed hydrophobic fumed silica.

5. An organic composite coated steel plate according to claim 1 wherein the proportions on a dry weight basis of the silica and the anionic aqueous resin in the resin layer are such that the silica is present in an amount of 10–100 parts by weight per 100 parts by weight of the anionic aqueous resin.

6. An organic composite coated steel plate according to claim 2 wherein the anionic aqueous urethane resin in the resin layer is one having an elongation of 50–1000% and a tensile strength of at least 200 kgf/cm$^2$.

7. An organic composite coated steel plate according to claim 2 wherein the proportions on a dry weight basis of the silica and the anionic aqueous urethane resin in the resin layer are such that the silica is present in an amount of 10–60 parts by weight per 100 parts of the anionic aqueous urethane resin.

* * * * *

UNITED STATES PATENT AND TRADEMARK OFFICE
CERTIFICATE OF CORRECTION

PATENT NO. : 5,514,483
DATED : May 7, 1996
INVENTOR(S) : Shigeko Sujita et al

It is certified that error appears in the above-indentified patent and that said Letters Patent is hereby corrected as shown below:

In Column 5, line 44, after "in", please insert --an--.

In Column 7, line 45, please change "rations" to --ratios--; and line 62, please change "m2/g;" to --$m^2/g$;--.

In Columns 9 and 10, under "TABLE 1-2", under heading "organic resin layer", under subheading "resin", at "Comparative Example 3", please change "polyethylene" to --polyethylene--.

In Columns 13 and 14, under "TABLE 2-2-continued", under heading "organic resin layer", under subheading "urethane resin", under further subheading "classification", at

UNITED STATES PATENT AND TRADEMARK OFFICE
CERTIFICATE OF CORRECTION

PATENT NO. : 5,514,483
DATED : May 7, 1996
INVENTOR(S) : Shigeko Sujita et al

It is certified that error appears in the above-indentified patent and that said Letters Patent is hereby corrected as shown below:

"Comparative Example 7", please change "water" to --water dissolved--.

Signed and Sealed this

Third Day of September, 1996

Attest:

BRUCE LEHMAN

Attesting Officer

Commissioner of Patents and Trademarks